(12) United States Patent
Yoshida

(10) Patent No.: US 7,581,431 B2
(45) Date of Patent: Sep. 1, 2009

(54) GAS LEAK DETECTION DEVICE AND METHOD FOR SAME

(75) Inventor: Naohiro Yoshida, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 17 days.

(21) Appl. No.: 10/590,855

(22) PCT Filed: Mar. 16, 2005

(86) PCT No.: PCT/JP2005/005299

§ 371 (c)(1),
(2), (4) Date: Aug. 25, 2006

(87) PCT Pub. No.: WO2005/088756

PCT Pub. Date: Sep. 22, 2005

(65) Prior Publication Data

US 2007/0193340 A1 Aug. 23, 2007

(30) Foreign Application Priority Data

Mar. 17, 2004 (JP) ............................. 2004-076636

(51) Int. Cl.
*G01N 3/00* (2006.01)
(52) U.S. Cl. ........................................ 73/40.5 R; 73/46
(58) Field of Classification Search ............... 73/40.5 R
See application file for complete search history.

(56) References Cited

U.S. PATENT DOCUMENTS

| 4,203,317 A | * | 5/1980 | Gupta | .............................. | 73/38 |
| 4,825,198 A | * | 4/1989 | Rolker et al. | ................. | 340/605 |
| 6,167,749 B1 | * | 1/2001 | Yanagisawa et al. | ..... | 73/40.5 R |
| 2002/0094468 A1 | | 7/2002 | Miura et al. | | |

FOREIGN PATENT DOCUMENTS

| DE | 34 45 281 A1 | 6/1986 |
| DE | 37 08 471 A1 | 9/1988 |
| DE | 102 01 669 A1 | 11/2002 |
| JP | A 6-223859 | 8/1994 |
| JP | A 8-329965 | 12/1996 |
| JP | A-09-022711 | 1/1997 |

(Continued)

*Primary Examiner*—Hezron Williams
*Assistant Examiner*—Mark Shabman
(74) *Attorney, Agent, or Firm*—Oliff & Berridge, PLC

(57) ABSTRACT

A gas leak detection device for a fuel cell system equipped with a main valve (SV1) in a fuel gas supply source (11), comprising a shutdown valve (SV2) provided in a fuel gas supply channel downstream of the main valve (SV1), pressure monitoring devices (p1, p2, 20) for monitoring a pressure in the fuel gas supply channel between the main valve and the shutdown valve, a depressurization treatment devices (10, 15, SV5) for depressurizing the inside of the fuel gas supply channel, and a determination device (20) for monitoring a variation of pressure in a sealed space of the fuel gas supply channel formed between the main valve and the shutdown valve after the main valve and the shutdown valve have been closed and determining the operation state of the main valve based on the variation of pressure in the sealed space. In the depressurization treatment, the fuel gas supply channel is depressurized until the pressure enters a pressure range in which the pressure can be monitored in the pressure monitoring device.

13 Claims, 8 Drawing Sheets

FOREIGN PATENT DOCUMENTS

| | | |
|---|---|---|
| JP | A 2001-032751 | 2/2001 |
| JP | A 2002-151126 | 5/2002 |
| JP | A 2002-168663 | 6/2002 |
| JP | A 2002-216812 | 8/2002 |
| JP | A 2002-373685 | 12/2002 |
| JP | A 2003-068334 | 3/2003 |
| JP | A 2003-148252 | 5/2003 |
| JP | A 2003-308866 | 10/2003 |
| JP | A 2003-308868 | 10/2003 |
| JP | A 2004-022198 | 1/2004 |
| JP | A 2004-031234 | 1/2004 |
| JP | A 2004-095425 | 3/2004 |

\* cited by examiner

GAS LEAK DETECTION DEVICE AND METHOD FOR SAME

TECHNICAL FIELD

The present invention relates to a fuel cell system, and more particularly to a technology for detecting a gas leak from a main valve of a hydrogen tank.

BACKGROUND ART

A technology has been developed for detecting leak of hydrogen gas, which is a fuel gas, in the conventional fuel cell systems. For example, as described in Japanese Patent Application Laid-open No. 2002-151126, a pressure of a hydrogen tank is detected to detect an amount of hydrogen gas used, the current amount of hydrogen gas used is estimated from the past driving history, and gas leak is detected based on the detected amount of hydrogen gas used and the estimated amount of hydrogen gas used.

Japanese Patent Application Laid-open No. 2003-308868 disclosed an invention according to which a pressure drop ratio is calculated based on an elapsed time and pressure information from a pressure sensor after closing a shutdown valve, and the shutdown valve is considered to be in a damaged state when the pressure drop ratio is less than a predetermined threshold value.

DISCLOSURE OF INVENTION

However, a pressure sensor has a range of pressure that can be measured, and a pressure sensor that can be used in a high pressure range generally has a wide range of pressure that can be measured, but the measurement accuracy thereof is low. Conversely, a pressure sensor that can be used in a comparatively low pressure range generally has a narrow range of pressure that can be measured, but the measurement accuracy thereof is relatively high.

Therefore, when pressure detection is conducted without taking into account the state of pressure detection means that has such a characteristic, highly accurate leak detection is impossible. The above-described technology does not take this issue into consideration.

Accordingly, it is an object of the present invention to provide a gas leak detection device that can detect a gas leak from a main valve of a hydrogen supply source with a high accuracy according to the pressure state of a fuel gas supply channel.

In order to solve the above-described problems, the present invention provides a gas leak detection device for a fuel cell system comprising a main valve in a fuel gas supply source, comprising a shutdown valve provided in a fuel gas supply channel downstream of the main valve, a pressure monitoring device that monitors a pressure in the fuel gas supply channel between the main valve and the shutdown valve, a depressurization treatment device that depressurizes the inside of the fuel gas supply channel, and a determination device that monitors a variation of pressure in a sealed space of the fuel gas supply channel formed between the main valve and the shutdown valve after the main valve and the shutdown valve have been closed and determines an operation state of the main valve based on the variation of pressure in the sealed space. In the depressurization treatment, the fuel gas supply channel is depressurized until the pressure enters a pressure range in which the pressure can be monitored in the pressure monitoring device.

Furthermore, the present invention also provides a gas leak detection device comprising a fuel gas supply source, a main valve that shuts down a fuel gas from the fuel gas supply source, a shutdown valve provided in a fuel gas supply channel downstream of the main valve, pressure monitoring means that monitors a pressure in the fuel gas supply channel between the main valve and the shutdown valve, depressurization treatment means that depressurizes the inside of the fuel gas supply channel, and determination means that monitors a variation of pressure in a sealed space of the fuel gas supply channel formed between the main valve and the shutdown valve after the main valve and the shutdown valve have been closed and determines the operation state of the main valve based on the variation of pressure in the sealed space. In the depressurization treatment, the fuel gas supply channel is depressurized to a pressure range in which the pressure can be monitored in the pressure monitoring means.

The present invention also provides a gas leak detection method for a fuel cell system comprising a main valve in a fuel gas supply source, comprising the steps of closing the main valve, while conducting a depressurization treatment of the downstream side of a fuel gas supply channel, closing a shutdown valve provided in the fuel gas supply channel, while conducting the depressurization treatment of the downstream side, monitoring a variation of pressure in a sealed space of the fuel gas supply channel formed between the main valve and the shutdown valve, after the main valve and the shutdown valve have been closed, and determining an operation state of the main valve based on a variation of pressure in the sealed space. In the step of shutting down the shutdown valve, the shutdown valve is shut down when the sealed space is depressurized to a pressure range in which the pressure can be detected in a pressure sensor for detecting a pressure in the sealed space.

In accordance with the present invention, because the downstream side of the closed main valve is depressurized, a difference in pressure occurs between the downstream side and upstream side. If a defect, for example, an abnormal closing or opening of the valve or incomplete sealing, occurs in the main valve, the fuel gas leaks out from the main valve due to the difference in pressure. Because the depressurized downstream side of the main valve becomes a sealed space when the shutdown valve is closed, if the fuel gas leaks out from the main valve, the pressure in this sealed space has to change. The sealing state of the main valve can be monitored by monitoring this variation of pressure.

In particular, in accordance with the present invention, in the depressurization treatment, the fuel gas supply channel is depressurized until the pressure enters a pressure range in which the pressure can be monitored in the pressure monitoring device or pressure sensor. Therefore, pressure conditions suitable for pressure detection are recognized and environmental setting can be made according to the characteristics of the pressure detection means. In particular, if a pressure range in the pressure monitoring device or pressure sensor enables the measurements in a comparatively low pressure range, highly accurate pressure detection is possible and a very small gas leak, such as in the main valve or shutdown valve, can be correctly detected.

The downstream side is preferably depressurized when the main valve and shutdown valve are closed, but the depressurization treatment and closing of the main valve may be conducted simultaneously or one of them can be conducted before the other.

The "main valve" is a (tank) switch valve or shutdown valve provided in the fuel gas inlet or outlet port of a hydrogen supply source (high-pressure tank or the like) or in the gas supply channel in the vicinity thereof.

Here, the "fuel gas supply source" includes a high-pressure hydrogen tank, a hydrogen tank using a hydrogen absorption alloy, a hydrogen supply mechanism based on a reforming gas, a liquid hydrogen tank, a liquefied fuel tank, etc., but is not limited thereto.

The "depressurization treatment" includes all the treatments capable of reducing the fuel gas pressure, for example, a treatment that causes the operation of fuel cells and consumption of fuel gas, a treatment of opening a purge valve, if such is provided, to reduce the pressure, and a treatment of opening a relief valve, if such is provided.

The "pressure monitoring device" includes pressure detection means such as pressure sensors, but has a more general meaning that also includes control devices that monitors the trend in pressure variation based on information from the pressure detection means.

Furthermore, a plurality of pressure monitoring device with different pressure ranges may be provided in the fuel gas supply range and one pressure monitoring device may be selected to monitor the pressure according to the level of the reduced pressure in the fuel gas supply channel. When pressure monitoring devices are provided correspondingly to the pressure range, e.g., for a high pressure and a low pressure, a pressure monitoring device is selected correspondingly to the pressure inside the gas supply channel after the depressurization, this device being capable of performing accurate detection at this pressure. Therefore, leak determination accuracy can be increased.

In accordance with the present invention, for example, a variation of pressure in the sealed space can be determined as an abnormality of the main valve in the case where the pressure rises to or above a predetermined value. This is because the pressure in the sealed space has to rise if the fuel gas leaks out through the main valve from the high-pressure fuel gas supply source.

Furthermore, a variation of pressure in the sealed space is determined as a gas leak from the fuel gas supply channel, for example, in the case where the pressure drops to or below the predetermined value. For example, the variation of pressure can be determined as a gas leak caused by a crack or other hole in the gas pipe. The pressure in the supply channel also drops if gas leak occurs in the supply channel when the main valve is closed incompletely. This is because the pressure has to drop if a gas leak in an amount exceeding the gas inflow from the main valve occurs in the supply channel where the sealed space has been formed, even if a certain amount of gas leaks from the main valve.

In accordance with the present invention, there are provided a recovery tank that recovers the fuel gas flowing through the fuel gas supply channel and drive means that recovers the fuel gas into the recovery tank during the depressurization treatment. With the above-described configuration, the fuel gas remaining in the supply channel can be recovered for storage in the recovery tank with the drive means, and the fuel gas that has been stored in the recovery tank can be supplied to the fuel cell at the time of the next start.

The term "drive means" refers to a structure that forcibly recovers the fuel gas and includes a pump, a compressor, and a turbine.

The shutdown valve and the main valve are preferably closed in the course of the depressurization treatment downstream of the shutdown valve. The shutdown valve and main valve, for example, have a pilot solenoid valve configuration, because with valves of such configuration, sealing can be reliably performed by the shutdown treatment, while reducing the downstream pressure.

BEST MODE FOR CARRYING OUT THE INVENTION

The preferred embodiments of the present invention will be described below with reference to the appended drawings. The below-described embodiments merely illustrated one mode for carrying out the present invention, and the present invention can be employed without being limited thereto.

Embodiment 1

Figure 1:
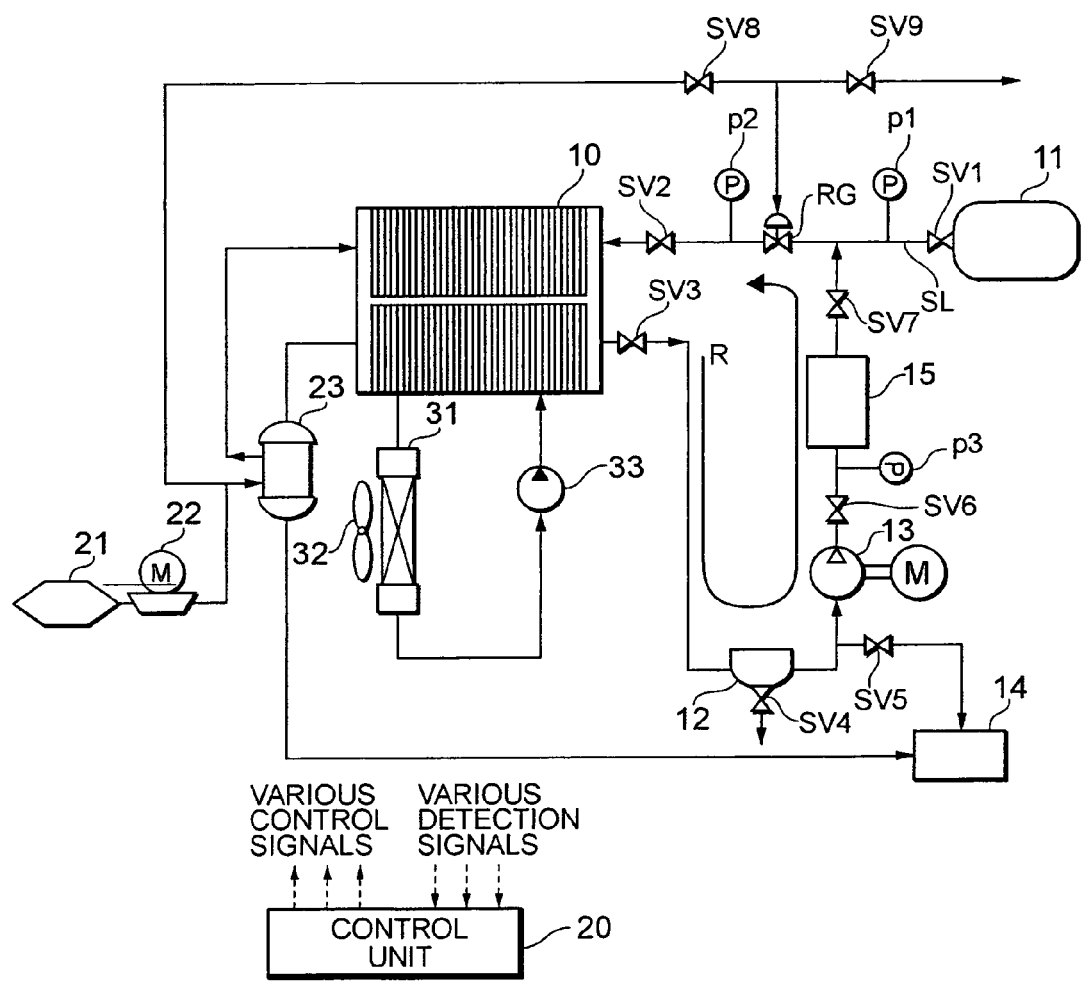
FIG. 1 is a block diagram of the fuel cell system of Embodiment 1.

In Embodiment 1, the gas leak detection device in accordance with the present invention is employed in a fuel cell system installed on a mobile structure such as an electric automobile. FIG. 1 shows the present fuel cell system in its entirety.

As shown in FIG. 1, the fuel cell system comprises a system for supplying a hydrogen gas, which is a fuel gas, to a fuel cell stack 10, a system for supplying air, which is an oxygen source, and a system for cooling the fuel cell stack 10.

The fuel cell stack 10 has a stack structure having stacked therein a plurality of separators having channels for hydrogen gas, air, and cooling liquid and cells, each comprising a MEA (Membrane Electrode Assembly) sandwiched between a pair of separators. The MEA has a structure in which a polymer electrolyte membrane is sandwiched between two electrodes: a fuel electrode and an air electrode. In the fuel electrode, a catalyst layer for the fuel electrode is provided on a porous support layer. In the air electrode, a catalyst layer for the air electrode is provided on a porous support layer. Because the reverse reaction of water electrolysis is induced in a fuel cell, hydrogen gas, which is a fuel gas, is supplied to a fuel electrode, which is a negative electrode (cathode), a gas (air) containing oxygen is supplied to an air electrode, which is a positive electrode (anode), the reaction represented by Formula (1) is induced on the fuel electrode, the reaction represented by Formula (2) is induced on the air electrode, electrons are caused to circulate, and an electric current is induced.

The system for supplying the hydrogen gas as a fuel gas to the fuel cell stack 10 comprises a hydrogen tank 11, which is equivalent to the hydrogen gas supply source of the present invention, a main valve (shutdown valve) SV1, a pressure regulating valve RG, a fuel cell inlet shutdown valve SV2, a fuel cell outlet shutdown valve SV3 via the fuel cell stack 10, a gas-liquid separator 12, a shutdown valve SV4 for a gas-liquid separator, a hydrogen pump 13, a circulation route shutdown valve SV6, a recovery tank 15, and a circulation route shutdown valve SV7. The hydrogen gas is supplied by a hydrogen gas supply channel from the main valve SV1 to the fuel cell stack 10 and also by a circulation route R which partly overlaps the aforementioned supply channel and in which the hydrogen gas is circulated through the pressure regulating valve RG, shutdown valves SV2, SV3, gas-liquid separator 12, hydrogen pump 13, shutdown valve SV6, recovery tank 15, and circulation route shutdown valve SV7.

The hydrogen tank 11 is filled with hydrogen gas under a high pressure. In addition to the high-pressure hydrogen tank, a hydrogen tank using a hydrogen absorption alloy, a hydrogen supply mechanism using a reformed gas, a liquid hydrogen tank, a liquefied fuel tank, etc., can be employed as a hydrogen source. the main valve SV1 of the present invention is provided in the supply port of the hydrogen tank 11. The main valve SV1 is open/close controlled by a control signal of a control unit 20, and supplying the hydrogen gas into the supply channel or shutting down the supply can be selected. The regulating quantity of the pressure regulating valve RG is determined by the operation state of a compressor 22 on the air electrode side. Thus, the pressure in the circulation route R is adjusted by the drive of compressor 22 and manipulation of shutdown valves SV8 and SV9 controlled by the control unit 20. For example, by opening the shutdown valve SV8, the pressure of air supplied to the pressure regulating valve RG is raised and the pressure supplied to the circulation route R is raised, and by opening the shutdown valve SV9, the pressure of air supplied to the pressure regulating valve RG is lowered and the pressure supplied to the circulation route R is lowered.

The fuel cell inlet shutdown valve SV2 is closed based on a control signal of the control unit 20 when gas leak detection in accordance with the present invention is implemented, for example, when power generation by the fuel cell is stopped. The change in pressure in a sealed space formed between the main valve SV1 and the shutdown valve SV2 when the main valve SV1 and the shutdown valve SV2 are closed is detected by a pressure sensor p1 or a pressure sensor p2, which is part of the pressure monitoring device in accordance with the present invention. The fuel cell outlet shutdown valve SV3 is also closed when power generation by the fuel cell is stopped.

The gas-liquid separator 12 removes moisture and other impurities generated by the electrochemical reactions proceeding in the fuel cell stack 10 during normal operation from the hydrogen off-gas and discharges them to the outside via the shutdown valve SV4. The hydrogen pump 13 forcibly circulates the hydrogen gas in the circulation route R of the hydrogen gas based on a control signal of the control unit 20. In particular, the hydrogen pump 13 operates so as to feed the hydrogen gas forcibly out even when power generation is stopped and to accumulate the gas in the recovery tank 15. The purge shutdown valve SV5 is connected to the circulation route R and open during purging and also when power generation is stopped to decrease the pressure inside the circulation route R. The hydrogen off-gas discharged from the purge shutdown valve SV5 is supplied to a diluting device 14 and diluted with an air off-gas. The joint operation of at least one component of the fuel cell stack 10, recovery tank 15, and purge shutdown valve SV5 is equivalent to depressurization treatment means for reducing the pressure downstream of the shutdown valve or main valve.

The recovery tank 15 has a capacity sufficient to store hydrogen retained in the circulation route R. When power generation is stopped, the recovery tank collects and stores the hydrogen gas that has been retained inside the circulation route R by driving the hydrogen pump 13. The shutdown valve SV6 is open during normal operation, but shut down by a control signal of the control unit 20 after the hydrogen gas has been stored in the recovery tank 15 in a power generation stop sequence. Furthermore, this shutdown valve is closed when the system is started until the hydrogen gas present in the recovery tank 15 is consumed. A pressure sensor p3 can detect the pressure in the recovery tank 15 after the shutdown valve SV6 has been closed. The circulation shutdown valve SV7 is closed when power generation is stopped, but open during normal operation and when the hydrogen gas stored in the recovery tank 15 is supplied to the fuel cell stack 10 when the system is started.

An air cleaner 21, a compressor 22, and a humidifier 23 are provided as a system for supplying air to the fuel cell stack 10. The air cleaner 21 purifies the external air and introduces it into the fuel cell system. The compressor 22 changes the quantity and pressure of the air supplied to the fuel cell stack 10 by compressing the introduced air based on a control signal of the control unit 20. The humidifier 23 performs moisture exchange between the compressed air and the air off-gas to provide the compressed air with an appropriate humidity. Part of the air compressed with the compressor 22 is supplied to control the pressure regulating valve of the fuel system, and the air pressure in the space between the shutdown valves SV8 and SV9 is applied to the diaphragm of the pressure regulating valve RG. The air off-gas discharged from the fuel cells tack 10 is supplied to the diluting device 14 to dilute the hydrogen off-gas.

The cooling system of the fuel cell stack 10 comprises a radiator 31, a fan 32, and a cooling pump 33. In this system, cooling liquid is circulated inside the fuel cell stack 10.

The control unit 20 is a well-known computer system such as an ECU (Electric Control Unit). By successively executing a software program for implementing the present invention that is stored in a ROM (not shown in the figure) with a CPU (central processing unit), which is not shown in the figure, this computer system can be operated as a gas leak detection device in accordance with the present invention. Thus, according to the below-described procedure (FIGS. 2 to 4), the control unit 20 closes the main valve SV1, conducts the depressurization treatment in the fuel gas supply channel downstream of the main valve SV1, closes the fuel cell inlet shutdown valve SV2 provided downstream of the fuel gas supply channel, forms a sealed space between the main valve and the shutdown valve, monitors a variation of pressure in the sealed space, and determines whether or not to close the main valve SV1 based on the variation of pressure in the sealed space.

No limitation is placed on the structure of each shutdown valve, but the use of, for example, shutdown valves employing a pilot-type solenoid will be assumed. This is because with the valves of this type, the fastening force can be expected to increase when the present invention is implemented. Thus, since the fastening force of the valve itself increases when the pressure in the hydrogen tank rises, the force during valve opening also increases. Using a pilot-type solenoid, as in the present embodiment, is preferred for reducing power consumed to open the valve. With the valve of this type, at the time of closing, the supply of electric current to the solenoid is terminated and the valve is closed at a speed rate determined by the balance of a residual magnetic flux and a spring force. The strength of the seal of the valve body depends on the impelling force of the spring, but if the pressure downstream of the valve is low, then a force equal to the difference in pressure in front and behind the valve is strongly applied to the valve body and the seal reliability increases. In this respect, when the shutdown valve (main valve) is closed in the present embodiment, a control signal for closing the valve is supplied after the depressurization treatment on the downstream side has been started. For this reason, closing the valve, while depressurizing the downstream zone of the shutdown valve, as in the present embodiment, is preferred from the standpoint of enabling a high sealing ability.

The operation in Embodiment 1 will be explained below with reference to the flowcharts shown in FIGS. 2 to 4. The operations of the flowcharts are repeatedly executed in appropriate intervals as long as the power source is turned on.

Figure 8:
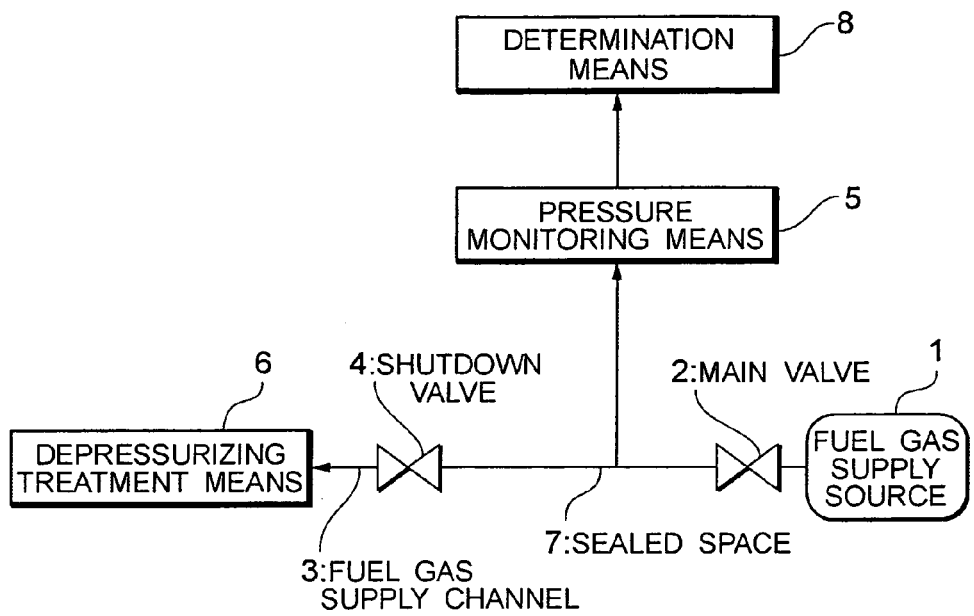
FIG. 8 is a functional block diagram of the present invention.

A functional block diagram realized in the present invention is shown in FIG. 8. Each function shown in FIG. 8 is realized by conducting control with the control unit 20 based on the aforementioned flowcharts. Thus, the device in accordance with the present invention comprises a main valve 2 (equivalent to SV1) for shutting down the fuel gas from a fuel gas supply source 1 (equivalent to the hydrogen tank 11), a shutdown valve 4 (equivalent to SV2 or SV3) provided in a fuel gas supply channel 3 downstream of the main valve 2, pressure monitoring means 5 (equivalent to the pressure sensors p1, p2 and control unit 20) for monitoring the pressure in the fuel gas supply channel 3 between the main valve 2 and the shutdown valve 4, depressurization treatment means 6 (equivalent to the fuel cell stack 10, recovery tank 15, and purge shutdown valve SV5 and the like) for depressurizing the inside of the fuel gas supply channel 3, and determination means 8 (equivalent to the control unit 20) for determining the operation state of the main valve 2 based on a variation of pressure in a sealed space 7 by monitoring the variation of pressure in the sealed space 7 of the fuel gas supply channel 3 formed between the main valve 2 and shutdown valve 4 after the main valve 2 and shutdown valve 4 have been closed. In the depressurization treatment, the pressure inside the fuel gas supply channel 3 is reduced to a pressure range in which the pressure can be monitored by the pressure monitoring devices 5.

The operation based on the features of Embodiment 1 will be described below in greater detail.

In the normal operation mode (power generation by the fuel cells) of the fuel cell system, the main valve SV1 is opened and hydrogen gas is supplied into the hydrogen supply channel. The air pressure applied to the diaphragm of the pressure regulating valve RG is regulated by opening and closing the shutdown valves SV8 and SV9, and the pressure of the hydrogen gas inside the circulation route R is controlled to the desired fuel gas pressure. The fuel cell inlet shutdown valve SV2 and outlet shutdown valve SV3 and the shutdown valves SV6 and SV7 are opened, and the hydrogen gas is supplied to the fuel electrodes of the fuel cell stack 10, while circulating inside the circulation route R. Furthermore, the compressor 22 is driven appropriately, the air humidified by the humidifier 23 is supplied to the air electrode of the fuel cell stack 10, and the air off-gas is discharged to the diluting device 14. The hydrogen off-gas containing moisture is supplied to the diluting device 14 via the purge shutdown valve SV5 that is opened and closed at the appropriate timings, diluted with the air off-gas, and discharged.

The gas leak determination in accordance with the present invention is usually implemented when the fuel cell system is stopped. However, the gas leak determination in accordance with the present invention can be also implemented during the operation, provided that power generation is temporarily stopped.

Figure 2:
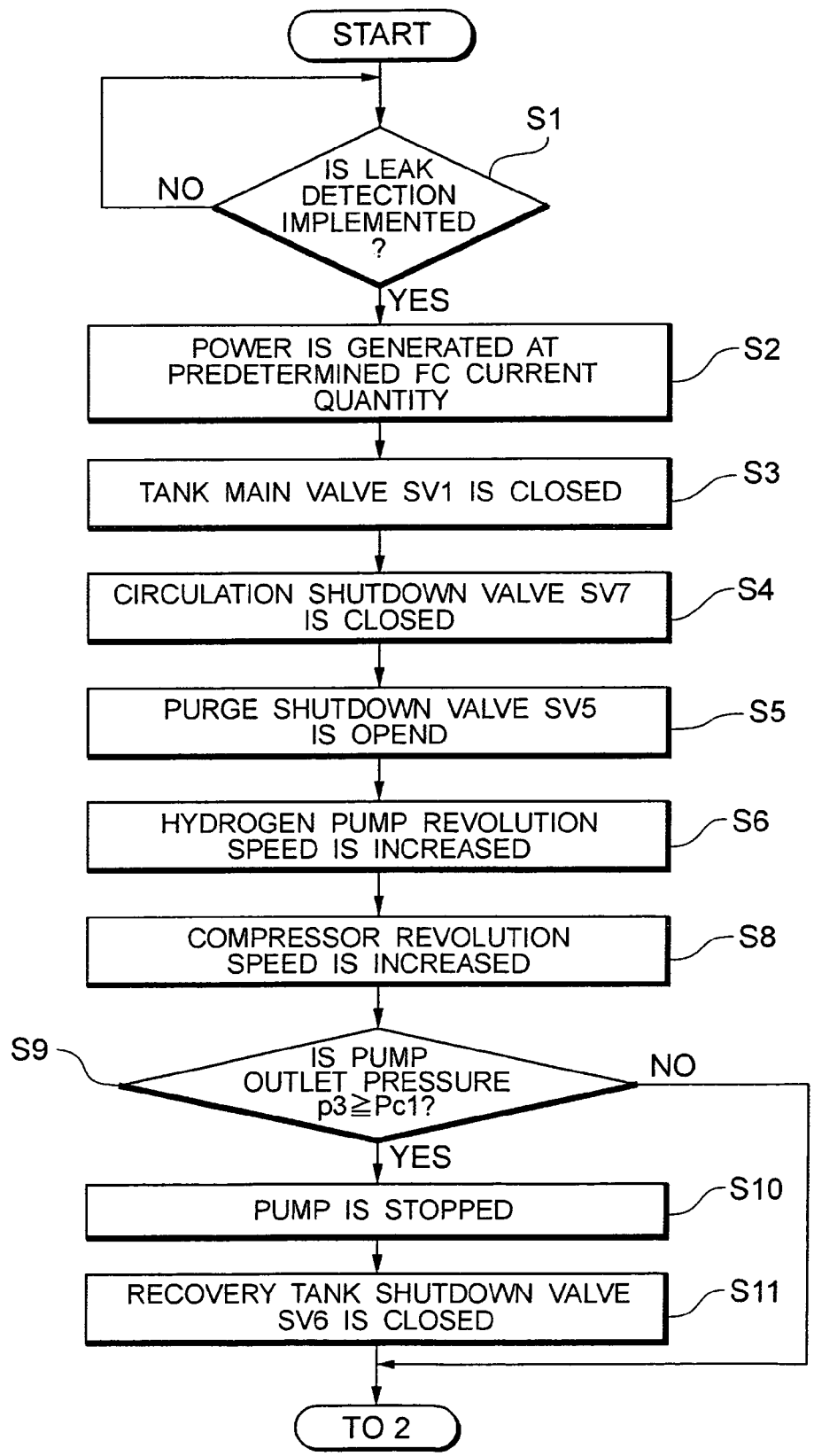
FIG. 2 is a flowchart illustrating a method for controlling the fuel cell system of Embodiment 1 (first flowchart).

As shown in FIG. 2, other power generation processing is executed before the timing at which the gas leak determination is executed (S1: NO). At the timing in which the gas leak determination is executed (S1: YES), the control unit 20 maintains power generation that has been heretofore continued, or further rises or decreases the power generation quantity and maintains the consumption of hydrogen gas in the fuel system in the fuel cell stack 10 (S2). This is because a certain amount of hydrogen gas remains in the hydrogen gas supply channel and it is preferred that this amount be consumed. The depressurization treatment of the fuel gas supply channel is started by continuing the consumption of hydrogen gas in the fuel cells tack 10.

The control unit 20 then closes the main valve SV1 of the high-pressure hydrogen tank 11 (S3). This is done to stop the supply of hydrogen gas from the high-pressure hydrogen gas, which is the fuel gas supply source, and to stop power generation. At this time, because the main valve SV1 is closed in a state where the consumption of hydrogen gas has already been continued, when the main valve is a pilot-type solenoid valve, the seal thereof can be made more reliable. In the present embodiment, whether or not the main valve SV1 has been completely closed at this time can be determined by the following procedure.

First, the hydrogen gas remaining in the circulation route R is collected in the recovery tank 15. For this purpose, the control unit first closes the circulation shutdown valve SV7 (S4), increases the revolution speed of the hydrogen pump 13 (S6), and sends the hydrogen gas remaining in the circulation route R into the recovery tank 15. At the same time, the control unit opens the purge shutdown valve SV5 (S5) and reduces the pressure inside the circulation route R. Because purging is conducted by opening the purge shutdown valve SV5, it becomes necessary to decrease the concentration of the discharged hydrogen gas. Accordingly, the control unit 20 increases the revolution speed of the compressor 22 (S8) and increases the quantity of air for diluting the purged hydrogen off-gas in the diluting device 14. The depressurization treatment of the circulation route R is further advanced by the recovery of the hydrogen gas to the recovery tank 15 and/or the purging of the hydrogen gas with the purge shutdown valve SV5.

The control unit 20 monitors the pressure of the pressure sensor p3 located before the recovery tank 15 (S9) and determines whether or not the pressure inside the recovery tank 15 has reached a predetermined pressure Pc1. Here, the pressure Pc1 is a vessel protection pressure that the recovery tank 15 is assumed to withstand when filled sufficiently with hydrogen; this pressure is determined by the withstand pressure of the recovery tank 15. For example, it can be set to the withstand pressure multiplied by a factor of 1.5. When the pressure in the recovery tank 15 is below this pressure Pc1 (S9: NO), this pressure is judged to be sufficiently low to be withstood by the recovery tank 15 and the procedure moves to the judgment of the next step. If the pressure in the recovery tank 15 reaches or exceeds the withstand pressure Pc1 (S9: YES), in order to avoid undesirable consequences, the control unit 20 immediately stops the driving of the hydrogen pump 13 (S10) and closes the shutdown valve SV6 in the recovery tank inlet to prevent a counterflow from the recovery tank 15 (S11). The pressure usually does not rise to the withstand pressure of the recovery tank 15.

With the above-described treatment, the fuel gas route downstream of the main valve SV1 is depressurized. After the depressurization treatment, a change in pressure is measured with the pressure monitoring device in accordance with the present invention, that is, the pressure sensors p1 and p2 and with the control unit 20 that makes judgments based on the detection signals of the sensors.

Figure 3:
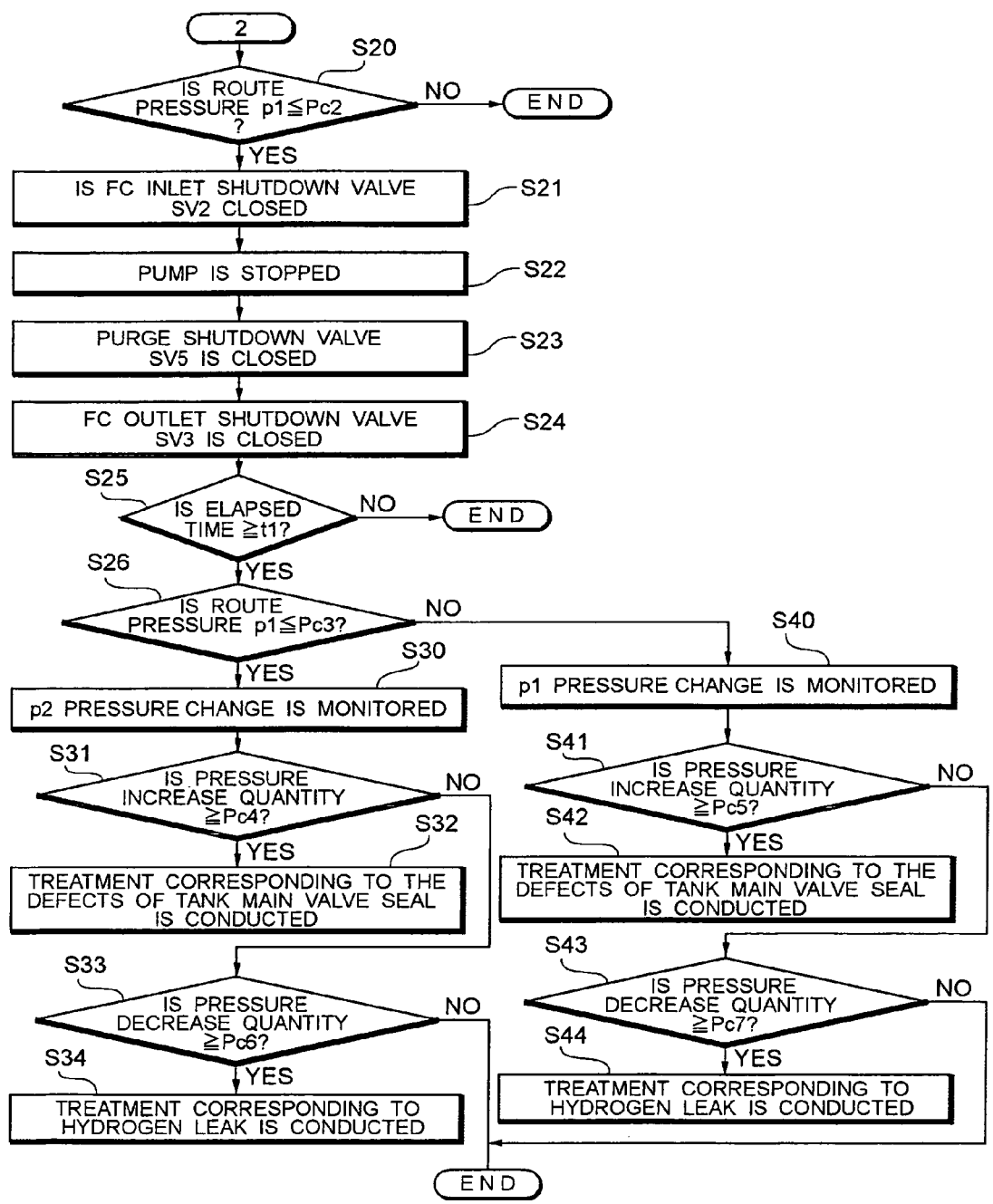
FIG. 3 is a flowchart illustrating a method for controlling the fuel cell system of Embodiment 1 (second flowchart).
Figure 4:
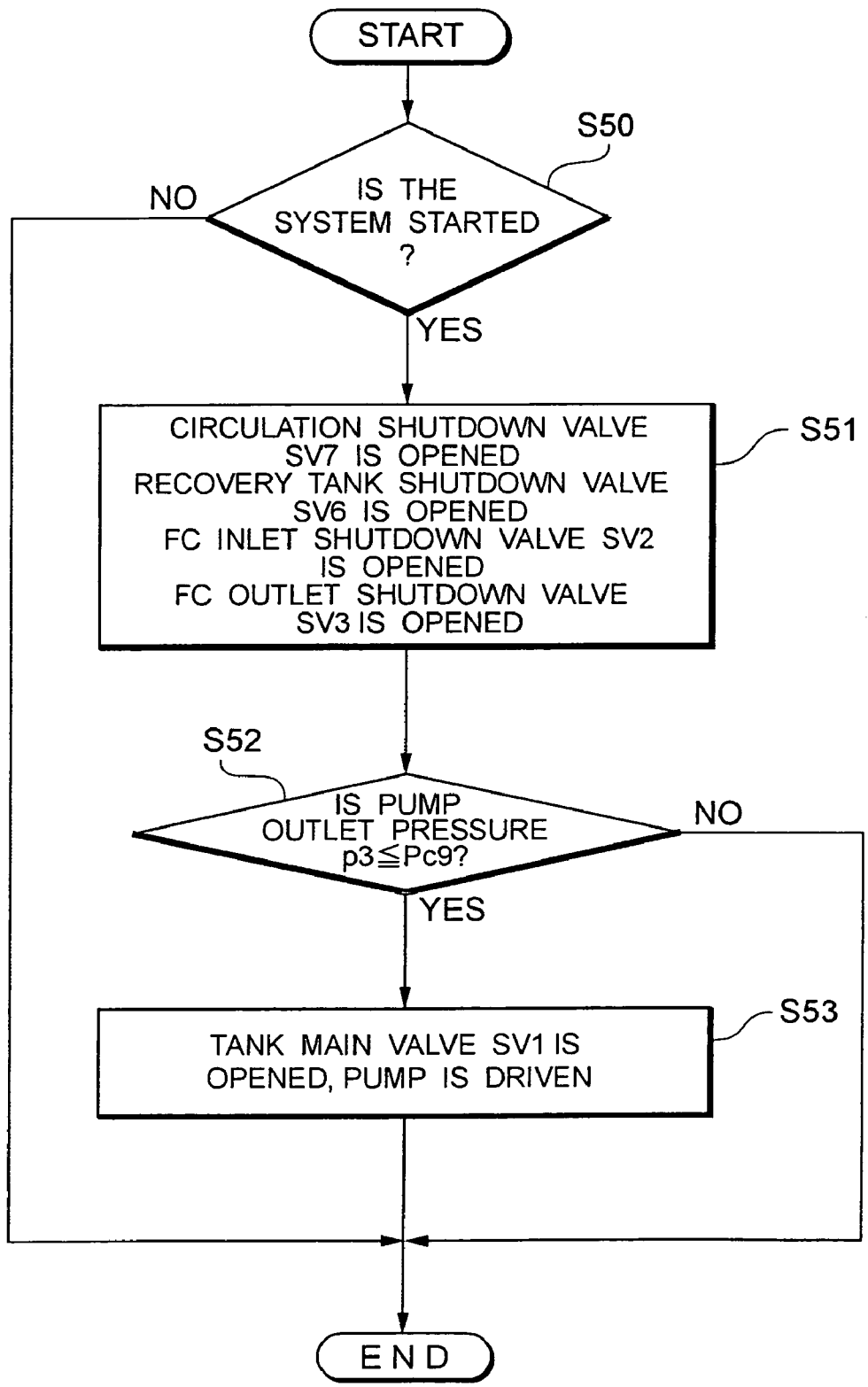
FIG. 4 is an operation flowchart at the time of start of Embodiment 1.

As shown in FIG. 3, the control unit 20 determines whether or not the pressure inside the route became equal to or less than the predetermined pressure Pc2, based on the detection signal of the pressure sensor p1 located directly below the main valve SV1 (S20). Here, a pressure that is set as the predetermined pressure Pc2 is such that a difference in pressure sufficient to conduct the gas leak determination in the present embodiment is generated between the zones upstream and downstream of the main valve SV1. When the pressure inside the route that was detected by the pressure sensor p1 is higher than this pressure Pc2 (S20: NO), a judgment is made that the depressurization treatment has to be continued and the procedure moves to the judgment of the next step.

As described hereinabove, the depressurization treatment downstream of the main valve SV1 is conducted by depressurization based on hydrogen gas consumption with the fuel cell stack 10, purging, and hydrogen gas recovery treatment to the recovery tank 15. The depressurization can be executed with any one of those treatment procedures, but it can be conducted faster by using a combination thereof.

When the pressure inside the route decrease to the pressure Pc2 (S20: YES) or below, a transition is made to the gas leak determination in accordance with the present invention. The control unit 20 closes the shutdown valve downstream of the main valve SV1 and measures the variation of pressure inside the route with time. Thus, the fuel cell inlet shutdown valve SV2 is closed (S21), the drive of the hydrogen pump 13 is stopped (S22), the purge shutdown valve SV5 is closed (S23), and the fuel cell outlet shutdown valve SV3 is closed (S24).

If the depressurization treatment downstream of the fuel cell inlet shutdown valve SV2 is continued when this valve is closed, a more complete sealing of the shutdown valve SV2 can be attained. Thus, when the shutdown valve SV2 is a pilot-type solenoid valve, the seal becomes structurally more reliable if the shutdown treatment is conducted, while reducing the pressure downstream of the valve.

The system then waits till a fixed time t1 elapses (S25: NO), and once the time t1 elapses (S25: YES), whether or not a change has occurred in the pressure inside the route measured with the pressure sensor p1 is inspected again (S26). Waiting for the time t1 is required with consideration for the response delay of the shutdown valve from the output of the control signal to actual completion of shutdown operation and also because it is necessary to wait till the change in pressure inside the circulation route R after the shutdown valve has been closed is stabilized.

As the next step, a pressure sensor for measuring the pressure fluctuations is switched in response to the pressure value attained by the depressurization treatment. The pressure ranges that can be measured are usually established for each pressure sensor individually. With a pressure sensor regulated to enable relative measurements of a high-pressure range, a pressure in this high-pressure range can be measured, and with a pressure sensor regulated to enable relative measurements of a low-pressure range, a pressure in this low-pressure range can be measured. The measurement accuracy is generally lower in the pressure sensors adapted to a high pressure and higher in the pressure sensors adapted to a low pressure. This is because in the pressure sensor adapted to a low pressure, smaller pressure variations can be discriminated because the pressure range that can be measured is lowered.

For example, in the present embodiment, the pressure sensor p1 for measuring a comparatively high pressure can measure a high pressure, but has a comparatively low accuracy, whereas, the pressure sensor p2 for measuring the pressure downstream of the regulating valve RG, which is a comparatively low pressure, has a small pressure range that can be measured, but a comparatively high accuracy. Conducting measurements with the pressure sensor p2 having a high accuracy is preferred because tiny pressure fluctuations can be detected, but in this case the expected depressurization of the hydrogen gas supply channel is sometimes impossible. For example, when the seal of the main valve SV1 becomes incomplete and the main valve is closed insufficiently causing a leak of a comparatively large amount of hydrogen gas even though a control signal for closing the main valve is outputted, the pressure in the hydrogen gas supply channel is not sufficiently decreased regardless of the depressurization treatment. In this case, the pressure sensor p1 for a high pressure has to be used despite a certain decrease in accuracy.

In order to determine such a case, the control unit 20 determines whether or not the pressure in the hydrogen gas supply channel is equal to or less than the predetermined pressure Pc3 by using the pressure sensor p1 (S26). Here, the pressure Pc3 is a threshold value serving to distinguish between the case where it is better to use the pressure sensor p2 for a low pressure and the case where it is better to use the pressure sensor p1 for a high pressure. For example, this pressure is set lower than the maximum pressure that can be identified with the pressure sensor p2 for a low pressure.

When the pressure sensor p2 for a low pressure has to be used (S26: YES), the control unit 20 monitors pressure fluctuations based on the detection signal of the pressure sensor p2 within a fixed interval (S30). For example, the pressure detected by the pressure sensor p2 within a certain interval is stored in a memory and then after waiting for a fixed interval, the pressure detected by the pressure sensor p2 is stored in the memory again. A variation quantity is then found by finding the difference between the two pressures. Furthermore, more accurate pressure fluctuations may be found by measuring the pressure three or more times and computing the average pressure. As a result, when the pressure rises and the variation quantity thereof becomes equal to or higher than the predetermined pressure difference Pc4 (S31: YES), because the pressure has risen, the abnormal closed state of the main valve SV1 can be fully inferred and a countermeasure against the abnormal state of the main valve seal SV1 is taken (S32). A variety of such countermeasures can be considered correspondingly to the structure of the fuel cell system. For example, a fuel cell can be stopped, or a signal lamp can be turned on inside an automobile cabin to inform the user that a service is necessary. Furthermore, the pressure difference Pc4 is set to a threshold value that makes it possible to distinguish sufficiently an increase in pressure caused by the gas leak from the main valve SV1 at the time of a low pressure.

Furthermore, when the pressure decreases and the variation quantity thereof is equal to or higher than the predetermined pressure difference Pc6 (S31: NO, S33: YES), because the pressure that essentially should not drop has decreased, it is possible that a leak has occurred somewhere in the route. Accordingly, a countermeasure against the hydrogen leak is taken (S34). The appropriate countermeasures include stopping the fuel cell, turning on an alarm lamp to inform the user that a service is necessary, and lowering the upper limit of subsequent pressure in the circulation route R or in the hydrogen gas supply channel in order to minimize the gas leak. Furthermore, the operation of the fuel cell system can be prohibited until the system is repaired. The predetermined pressure difference Pc6 is a threshold value that makes it possible to distinguish a drop in pressure at which the hydrogen leak can be sufficiently estimated under a low pressure.

On the other hand, when a decision is made that the pressure sensor p1 for a high pressure has to be used (S26: NO), the control unit 20 similarly monitors a pressure fluctuation detected by the pressure sensor p1 within a fixed interval in the same manner as described above (S40). The monitoring mode is the same as described above with reference to the pressure sensor p2. As a result, when the pressure rises and the variation quantity thereof becomes equal to or higher than the predetermined pressure difference Pc5 (S41: YES), because the pressure has risen, the abnormal closed state of the main valve SV1 can be fully inferred and a countermeasure against the abnormal state of the main valve seal SV1 is taken (S42). In this case, countermeasures identical to those of step S32 can be considered. Furthermore, the pressure difference Pc5 is set to a threshold value that makes it possible to distinguish sufficiently an increase in pressure caused by the gas leak from the main valve SV1 at the time of a high pressure.

Furthermore, when the pressure decreases and the variation quantity thereof is equal to or higher than the predetermined pressure difference Pc7 (S41: NO, S43: YES), because the pressure that essentially should not drop has decreased, it is possible that a defect has occurred somewhere in the route. Accordingly, a countermeasure against the hydrogen leak is taken (S44). In this case, countermeasures identical to those of step S34 can be considered. The predetermined pressure difference Pc7 is a threshold value that makes it possible to distinguish a drop in pressure at which the hydrogen leak can be sufficiently estimated under a high pressure.

In any of other cases (S33: NO, S43: NO), there is no abnormal closing of the main valve SV1 or gas leak in the hydrogen gas supply channel and the treatment is stopped.

The gas leak determination of the present embodiments ends as described hereinabove, but when an electric automobile (fuel cell system) is started next time, the hydrogen gas contained in the recovery tank 15 should be preferentially used. Accordingly, hydrogen gas is used in the treatment illustrated by FIG. 4. First, if a start is designated (S50: YES), the control unit 20 opens the circulation shutdown valve SV7, recovery tank shutdown valve SV6, fuel cell inlet shutdown valve SV2, and fuel cell outlet shutdown valve SV3 that were heretofore closed (S52). With the above-described treatment, the hydrogen gas contained in the recovery tank 15 is supplied from the outlet thereof into the hydrogen gas supply channel and power generation is started with this hydrogen gas.

As long as the hydrogen gas remains in the recovery tank 15 (S52: NO), the outlet pressure of the hydrogen pump 13 (pressure in the recovery tank) p3 does not drop. Accordingly, when the outlet pressure p3 of the hydrogen pump is higher than the predetermined pressure Pc9 (S52: NO), power generation using the hydrogen gas contained in the recovery tank 15 is implemented, and when the outlet pressure p3 of the hydrogen pump becomes equal to or lower than Pc9 (S52: YES), a control signal for opening the main valve SV1 of the high-pressure tank 11 is supplied for the first time (S53). At the same time, a control signal for driving the hydrogen pump 13 is also outputted. The threshold value Pc5 for determining the pressure of the recovery tank 15 is set to a threshold value that can discriminate between the case where the hydrogen gas contained in the recovery tank 15 still remains and the case where the entire hydrogen gas has been supplied.

With the above-described Embodiment 1, a gas leak of the main valve can be adequately judged. Therefore, the system can be adapted even to increased pressure of the hydrogen tank 11.

Furthermore, with Embodiment 1, even if a large amount of hydrogen gas is retained in the hydrogen gas supply channel or circulation route R due to increase in pressure in the hydrogen tank 11, because the hydrogen gas contained in the route is fed to the recovery tank 15 when the operation is stopped, the inside of the circulation route R at the time the operation is stopped can be maintained in a safe state with a very small amount of hydrogen gas.

In particular, with the present embodiment, because a pressure sensor monitoring a change in pressure is selected according to the pressure in the hydrogen gas supply channel after the depressurization treatment, a pressure sensor with a higher accuracy can be selected according to the current pressure and the hydrogen gas leak from the main valve SV1 can be detected reliably and with a high accuracy.

Furthermore, because the shutdown valve SV2, SV3, SV6, and SV7 are closed, while the depressurization treatment is performed, the sealing effect can be increased when, for example, pilot-type solenoid valves or valves having a similar structure are used for those shutdown valves. This is because those valves can increase sealing performance when the pressurization treatment is conducted, while reducing the pressure on the rear-stream side.

Furthermore, if a pressure variation quantity downstream of the hermetically sealed main valve SV1 is higher than a predetermined pressure, the judgment is that the main valve is defective, and if it is less than the predetermined value, the judgment is that the hydrogen gas supply channel is damaged. Therefore, a plurality of gas leak modes can be detected by the pressure variation mode.

Furthermore, the system is cost efficient because when it is started, the hydrogen gas is first supplied from the recovery tank 15.

Embodiment 2

Figure 5:
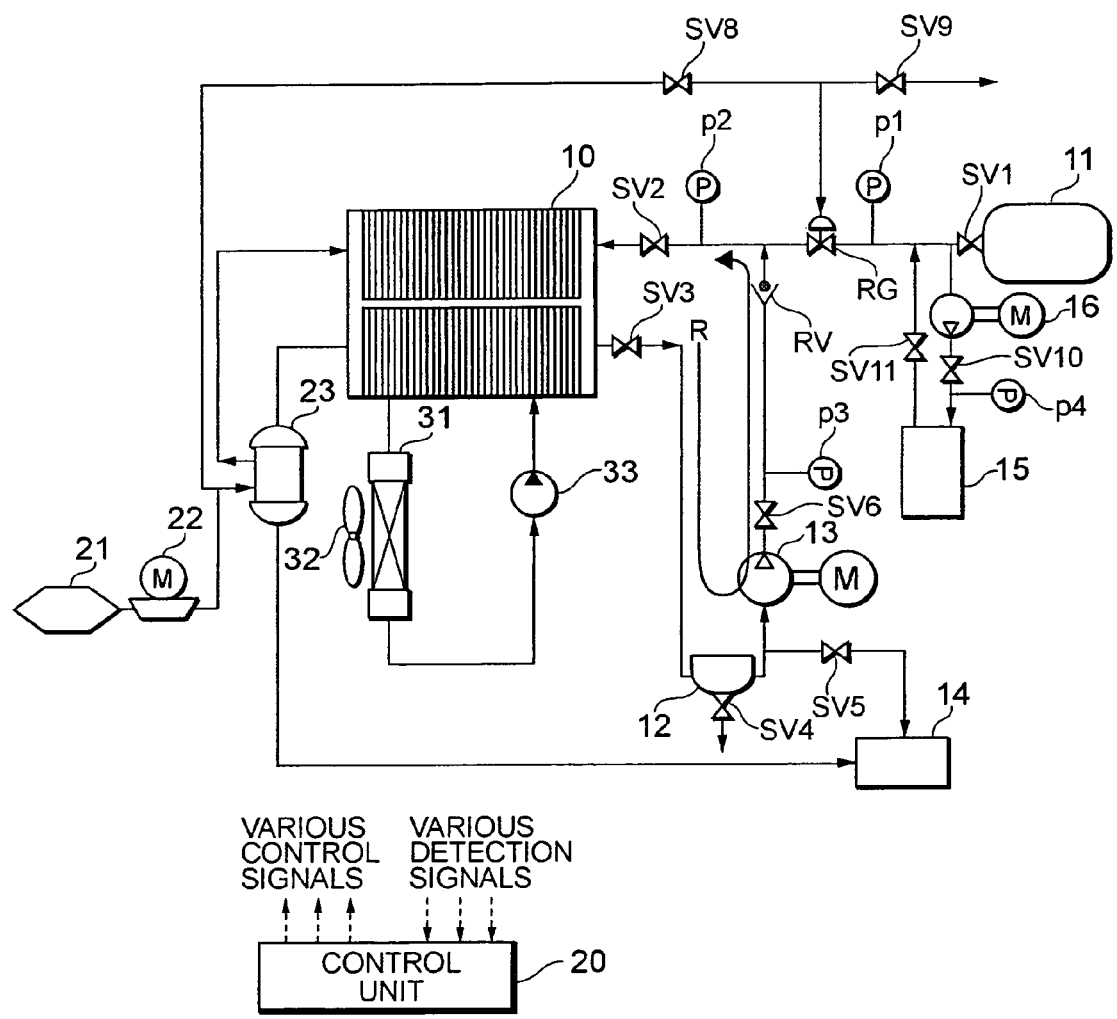
FIG. 5 is a block diagram of the fuel cell system of Embodiment 2.

Embodiment 2 of the present invention relates to a structure in which the recovery tank of Embodiment 1 is provided at the main valve SV1. FIG. 5 is a system diagram of the entire fuel cell system of Embodiment 2.

As shown in FIG. 5, the fuel cell system of Embodiment 2 has a structure almost identical to that of the system of Embodiment 1, but the recovery tank 15 is provided in the vicinity of the main valve SV1.

In other words, the channel for supplying hydrogen gas to the recovery tank 15 is connected downstream of the main valve SV1, and a circulation route is provided which comprises a hydrogen pump 16, a shutdown valve SV10, a pressure sensor p4, a recovery tank 15, and a shutdown valve SV11. Furthermore, a return check valve RV is provided instead of the recovery tank 15 and circulation shutdown valve SV7 in the circulation route R. The point where the circulation route R is joined to the hydrogen gas supply channel is downstream of the pressure regulating valve RG. Other features are identical to those of Embodiment 1 illustrated by FIG. 1.

Figure 6:
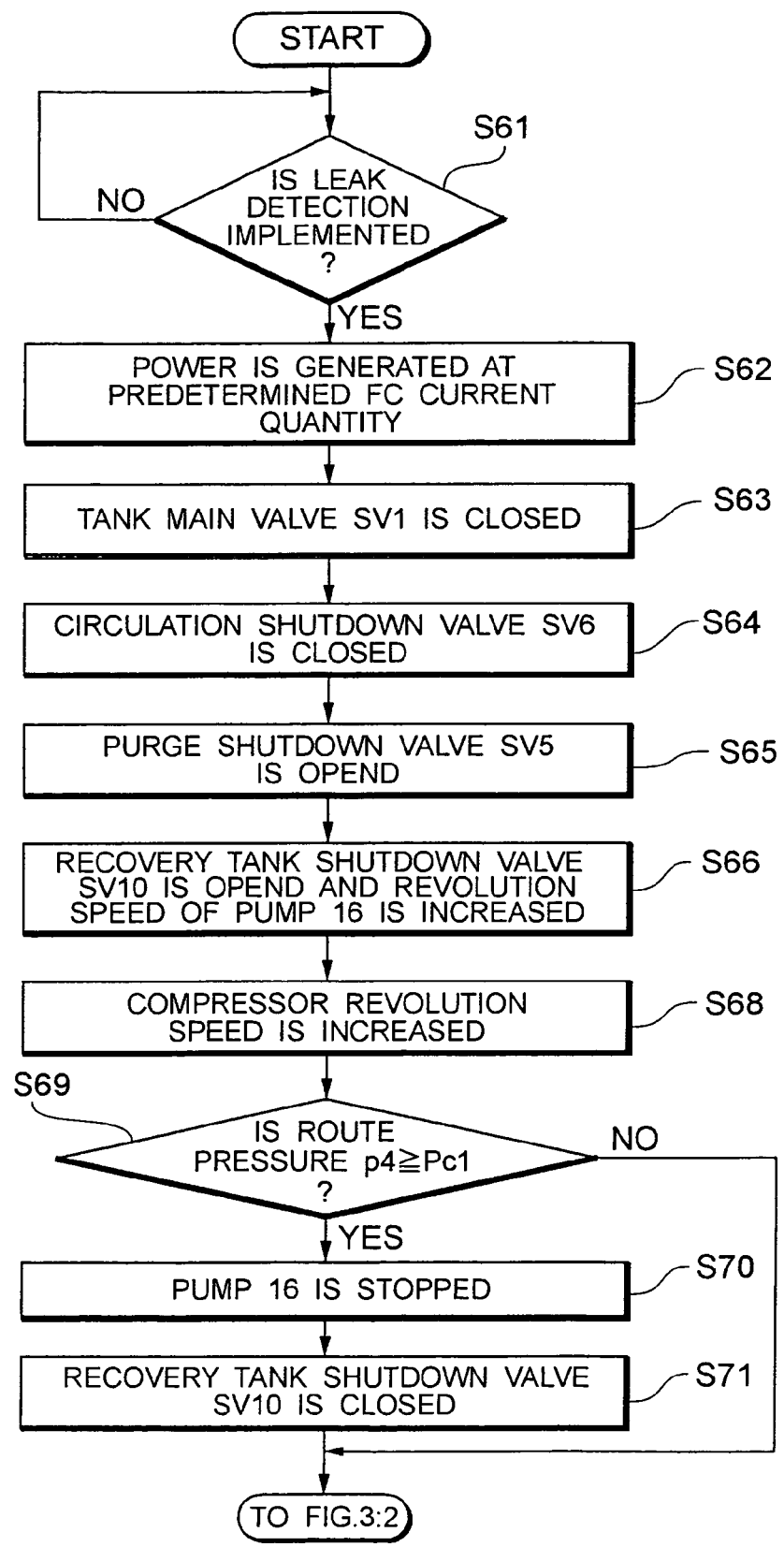
FIG. 6 is a flowchart illustrating a method for controlling the fuel cell system of Embodiment 2.

The operation of Embodiment 2 will be described below with reference to the flowcharts shown in FIGS. 6 to 8. The operations of the flowcharts are repeatedly executed in appropriate intervals as long as the power source is turned on.

The processing conducted during normal operation (power generation by the fuel cell) is the same as described above. First, as shown in FIG. 6, other power generation processing is executed before the timing at which the gas leak determination is executed (S61: NO).

At the timing in which the gas leak determination is executed (S61: YES), the control unit 20 closes the main valve SV1 of the high-pressure hydrogen tank 11 (S63), while maintaining the hydrogen gas consumption of the fuel system (S62), in the same manner as in Embodiment 1.

In the present embodiment, the hydrogen gas located in the circulation route R is depressurized by purging from the fuel cell stack 10 and purge control valve SV5. The control unit 20 closes the shutdown valve SV6 to close the circulation route R (S64), opens the purge shutdown valve SV5 (S65), and increases the revolution speed of the compressor 22 (S68).

On the other hand, to accommodate in the recovery tank 15 the hydrogen gas that has been retained in the hydrogen gas supply channel upstream of the pressure regulating valve RG, the control unit 20 drives the hydrogen pump 16 and opens the shutdown valve SV10 (S66). Then, similarly to Embodiment 1, the control unit 20 monitors the pressure of the pressure sensor p4 located before the recovery tank 15 (S69) and determines whether or not the pressure inside the recovery tank 15 has reached a predetermined pressure Pc1. When the pressure in the recovery tank 15 is below this pressure Pc1 (S69: NO), this pressure is judged to be sufficiently low to be withstood by the recovery tank 15 and the procedure moves to the judgment of the next step. If the pressure in the recovery tank 15 reaches or exceeds the withstand pressure Pc1 (S69: YES), in order to avoid undesirable consequences, the driving of the hydrogen pump 16 is immediately stopped (S70) and the shutdown valve SV10 in the recovery tank inlet is closed to prevent a counterflow from the recovery tank 15 (S71).

With the above-described treatment, the fuel gas route downstream of the main valve SV1 is depressurized. After the depressurization treatment, a change in pressure is measured in the same manner as in Embodiment 1 (see FIG. 3). Thus, the control unit 20 shuts down a shutdown valve for disconnecting the sealed space relating to gas leak detection, while continuing the depressurization treatment, and monitors a variation of pressure in this sealed space.

Figure 7:
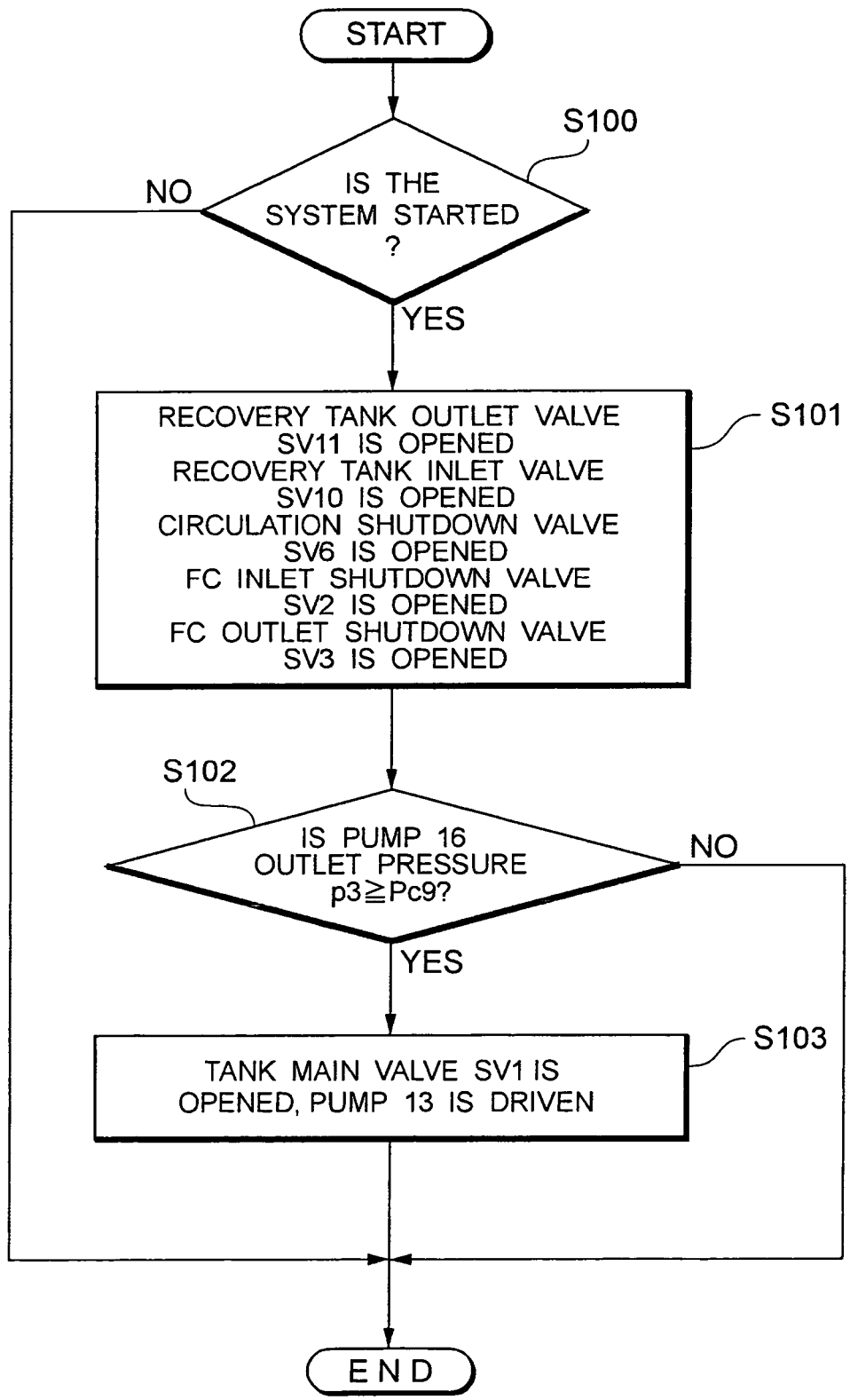
FIG. 7 is an operation flowchart at the time of start of Embodiment 2.

When the electric automobile (fuel cell system) is started next time, the hydrogen gas contained in the recovery tank 15 is preferentially used in the treatment such as illustrated by FIG. 7. First, if a start is designated (S100: YES), the control unit 20 opens the shutdown valves SV10 and SV11 that are located before and after the recovery tank 15 and have been heretofore closed and at the same time opens the shutdown valve SV6 of the circulation route R, fuel cell inlet shutdown valve SV2, and fuel cell outlet shutdown valve SV3 (S101). With the above-described treatment, the hydrogen gas contained in the recovery tank 15 is supplied from the outlet thereof into the hydrogen gas supply channel, the pressure of the hydrogen gas is regulated with the pressure regulating valve RG, the hydrogen gas is supplied to the fuel cell tank 10, and power generation is started.

As long as the hydrogen gas remains in the recovery tank 15 (S102: NO), the outlet pressure of the hydrogen pump 16 (pressure in the recovery tank) p4 does not drop. Accordingly, when the outlet pressure p4 of the hydrogen pump is higher than the predetermined pressure Pc9 (S102: NO), power generation using the hydrogen gas contained in the recovery tank 15 is implemented, and when the outlet pressure p4 of the hydrogen pump becomes equal to or lower than Pc9 (S102: YES), a control signal for opening the main valve SV1 of the high-pressure tank 11 is supplied for the first time (S103). At the same time, a control signal for driving the hydrogen pump 13 of the circulation route is also outputted.

With the above-described Embodiment 2, the present invention can be carried out and the effects identical to those of Embodiment 1 can be demonstrated even when the recovery tank is provided in the vicinity of the main valve outside the circulation route R.

Other Embodiments

The present invention is not limited to the above-described embodiments and can be used in a variety of modifications. For example, the position where the recovery tank is provided is not limited to those of the above-described embodiments, and the design can be changed in a variety of ways. It goes without saying that the gas leak determination treatment of the present invention is also applicable to systems containing no recovery tank.

Furthermore, the circulation route R is not a necessary feature, and the present invention can be also employed in fuel cell systems without the fuel gas circulation.

In the above-described embodiments, a gas leak was detected with respect to the main valve SV1, but valve opening or seal reliability can be determined in a similar manner also with respect to the downstream shutdown valves SV2, SV3, and SV6. Thus, gas leak caused by seal abnormality and valve opening abnormality of the upstream shutdown valves and can be detected by providing respective pressure sensors downstream of the downstream shutdown valves SV2, SV3, and SV6, forming a sealed space in a route between the shutdown valve and one downstream shutdown valve, and detecting a change in pressure of the sealed space with a pressure sensor or the like. If the change in pressure in the sealed space is the increase in pressure, an abnormality of the upstream shutdown valve can be inferred, and if the pressure decreases, gas leakage in this route section can be inferred.

INDUSTRIAL APPLICABILITY

With the present invention described hereinabove, a section downstream of a main valve is depressurized to form a sealed space and a variation of pressure in the sealed space is monitored, whereby the closed state of the main valve can be reliably detected. In particular, the depressurization treatment is controlled to attain a pressure range in which pressure monitoring can be carried out with a high accuracy. Therefore, a gas leak can be detected with a high accuracy.

Therefore, the present invention is generally applicable to fuel cell systems requiring gas leak detection. Such fuel cell systems can be used when carried by ground mobile objects such as vehicles, seaborne mobile objects such as ships, underwater mobile objects such as submarines, and airborne mobile objects such as aircrafts and when disposed at stationary objects such as power generation plants.

I claim:

1. A gas leak detection device for a fuel cell system comprising a main valve in a fuel gas supply source, comprising:
    a shutdown valve provided in a fuel gas supply channel downstream of said main valve;
    a plurality of pressure monitoring devices that each operate within a different predetermined pressure range and monitor a pressure in said fuel gas supply channel between said main valve and said shutdown valve;
    a depressurization treatment device that depressurizes the inside of said fuel gas supply channel; and
    a determination device that monitors a variation of pressure in a sealed space of said fuel gas supply channel formed between said main valve and said shutdown valve after said main valve and said shutdown valve have been closed and determines an operation state of said main valve based on the variation of pressure in said sealed space, wherein
    in said depressurization treatment, said fuel gas supply channel is depressurized until the pressure enters the predetermined pressure range in which the pressure can be monitored in said plurality of pressure monitoring devices.

2. The gas leak detection device according to claim 1, wherein
at least one of said pressure monitoring devices is selected to monitor the pressure according to the pressure attained by depressurization of said fuel gas supply channel.

3. The gas leak detection device according to claim 1, wherein
a variation of pressure in said sealed space is determined as an abnormally of said main valve in the case where the pressure rises to or above a predetermined value.

4. The gas leak detection device according to claim 1, wherein
a variation of pressure in said sealed space is determined as a gas leak from said fuel gas supply channel in the case where the pressure drops to or below the predetermined value.

5. The gas leak detection device according to claim 1, further comprising
a recovery tank that recovers said fuel gas that flows through said fuel gas supply channel; and
drive means that recovers said fuel gas into said recovery tank during said depressurization treatment.

6. The gas leak detection device according to claim 1, wherein said shutdown valve and said main valve are closed during depressurization downstream.

7. The gas leak detection device of claim 5, wherein the depressurization is executed using at least two of the following methods: hydrogen gas consumption within the fuel cell, a purge from the gas supply channel, and the hydrogen gas recovery treatment to the recovery tank.

8. The gas leak detection device according to claim 1, wherein the plurality of pressure monitoring devices include at least a high pressure monitoring device and a low pressure monitoring device,
wherein the high pressure monitoring device is configured to have a first pressure monitoring range and to monitor a pressure in a sealed space of the fuel gas supply channel formed between the main valve and a first shut down valve after the main valve,
and the low pressure monitoring device is configured to have a second pressure monitoring range less than the first monitoring range of the first pressure monitoring device and to monitor a pressure in a sealed space of the fuel gas supply channel between the first shut down valve and a second shut down valve.

9. The gas leak detection device according to claim 1, wherein the plurality of pressure monitoring devices monitor the pressure in the fuel gas supply channel when a predetermined time elapses after said shut down valve has been closed.

10. The gas leak detection device of claim 1, wherein the depressurization treatment device depressurizes the inside of the fuel gas supply channel by continuing consumption of the fuel gas in the fuel cell system.

11. A gas leak detection device, comprising:
a fuel gas supply source;
a main valve that shuts down a fuel gas from said fuel gas supply source;
a shutdown valve provided in a fuel gas supply channel downstream of said main valve;
a plurality of pressure monitoring means that each operate within a different predetermined pressure range and monitor a pressure in said fuel gas supply channel between said main valve and said shutdown valve;
depressurization treatment means that depressurizes the inside of said fuel gas supply channel; and
determination means that monitors a variation of pressure in a sealed space of said fuel gas supply channel formed between said main valve and said shutdown valve after said main valve and said shutdown valve have been closed and determines an operation state of said main valve based on the variation of pressure in said sealed space, wherein
in said depressurization treatment, said fuel gas supply channel is depressurized until the pressure enters the predetermined pressure range in which the pressure can be monitored in said plurality of pressure monitoring means.

12. A gas leak detection method for a fuel cell system comprising a main valve in a fuel gas supply source, comprising the steps of:
closing said main valve, while conducting a depressurization treatment of the downstream side of a fuel gas supply channel;
closing a shutdown valve provided in said fuel gas supply channel, while conducting the depressurization treatment of the downstream side;
monitoring via a plurality of monitoring devices that each operate within a different predetermined pressure range a variation of pressure in a sealed space of said fuel gas supply channel formed between said main valve and said shutdown valve, after said main valve and said shutdown valve have been closed;
and determining an operation state of said main valve based on a variation of pressure in said sealed space, wherein
in the step of closing said shutdown valve, said shut down valve is shut down when said sealed space is depressurized until the pressure enters the predetermined pressure range in which the pressure can be detected in the plurality of pressure monitoring devices for detecting a pressure in said sealed space.

13. The gas leak detection method according to claim 12, wherein
when a plurality of pressure sensors with different pressure ranges are provided in said fuel gas supply channel,
in the step of monitoring said variation of pressure, one of said pressure sensors is selected for pressure detection according to the pressure in said sealed space.

* * * * *